(12) United States Patent
Steiner

(10) Patent No.: US 8,006,068 B1
(45) Date of Patent: Aug. 23, 2011

(54) PROCESSOR ACCESS TO DATA CACHE WITH FIXED OR LOW VARIABLE LATENCY VIA INSTRUCTIONS TO AN AUXILIARY PROCESSING UNIT

(75) Inventor: Glenn C. Steiner, Los Altos, CA (US)

(73) Assignee: Xilinx, Inc., San Jose, CA (US)

( * ) Notice: Subject to any disclaimer, the term of this patent is extended or adjusted under 35 U.S.C. 154(b) by 369 days.

(21) Appl. No.: 11/787,926

(22) Filed: Apr. 18, 2007

(51) Int. Cl.
*G06F 15/76* (2006.01)

(52) U.S. Cl. .................................................. 712/34

(58) Field of Classification Search ................ 712/34
See application file for complete search history.

(56) References Cited

U.S. PATENT DOCUMENTS

| | | | |
|---|---|---|---|
| 6,944,746 B2 * | 9/2005 | So ................................. | 712/34 |
| 7,167,971 B2 * | 1/2007 | Asaad et al. .................... | 712/34 |
| 7,194,600 B2 * | 3/2007 | Douglass et al. ............... | 712/37 |
| 7,200,723 B1 * | 4/2007 | Ansari et al. ................... | 711/154 |
| 7,200,741 B1 * | 4/2007 | Mine .............................. | 712/244 |
| 7,434,029 B2 * | 10/2008 | Chauvel et al. ................ | 712/205 |
| 7,490,221 B2 * | 2/2009 | Evans et al. ..................... | 712/34 |
| 2002/0013892 A1 * | 1/2002 | Gorishek et al. ............... | 712/227 |
| 2003/0097543 A1 * | 5/2003 | Wishneusky .................... | 712/34 |
| 2008/0059771 A1 * | 3/2008 | Svendsen et al. .............. | 712/218 |

* cited by examiner

*Primary Examiner* — Jacob Petranek
(74) *Attorney, Agent, or Firm* — W. Eric Webostad; LeRoy D. Maunu

(57) ABSTRACT

Access to data storage is described. A general-purpose processor and an auxiliary processing unit (APU) interface coupled to the general-purpose processor are provided. Data storage coupled to the general-purpose processor via the APU interface is provided for a fixed or low variable read latency access and a fixed write latency access to the data storage. A first instruction is passed to the general-purpose processor and to the APU interface. The first instruction is identified as part of a set of instructions accessible by the APU interface. The first instruction is used to write data into the data storage. A second instruction is passed to the general-purpose processor and to the APU interface. The second instruction is identified as part of the set of instructions accessible by the APU interface. The second instruction is used to read the data from the data storage, and the data is then output.

20 Claims, 4 Drawing Sheets

PROCESSOR ACCESS TO DATA CACHE WITH FIXED OR LOW VARIABLE LATENCY VIA INSTRUCTIONS TO AN AUXILIARY PROCESSING UNIT

FIELD OF THE INVENTION

One or more aspects of the invention relate generally to integrated circuits and, more particularly, to access to data storage with a fixed or low variable latency.

BACKGROUND

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

Processor systems frequently store and access information in cache memory ("cache"). Processor cache generally is significantly faster for writing and reading information than main or system memory. Thus, routines that are time-sensitive or time-critical may be placed in cache. An example of such a routine is an interrupt service routine. If an interrupt service routine is not pulled entirely from cache, such as partly stored in cache and partly stored in system memory, then there are at least two significant negative consequences. Not only is execution of such routine slowed by an increase in latency due to accessing from system memory in comparison to a cache only access, the latency is variable. In other words, there is a latency associated with cache access and one or more other latencies associated with system memory different from the latency associated with cache access. As is known, conventionally cache access latency is fixed for both reads and writes, though not necessarily the same latency for both. While some cache is capable of being locked down to keep information, such as for an interrupt service routine, from leaving the cache, locking down too much cache invalidates or at least significantly diminishes its usefulness.

Another use of cache is for fixed, low latency data access, such as table lookups. However, access to a table conventionally is a "random access," and thus data may fall out of cache due to stagnation, and be replaced with other cached data more frequently or more recently accessed. Furthermore, a data lookup table may become sufficiently large to the extent that it is not feasible or possible to entirely store it in cache.

As is well known, cache does not store as much information as system memory. However, conventionally a system bus by which system memory is accessed is an arbitrated bus, which makes latency associated with system memory access greater than that associated with cache access. Additionally, such a system bus conventionally runs at a frequency significantly slower than that of the processor clock, and as cache may be operated at the frequency of the processor clock, this too means that access to system memory is slower than access to cache.

In some processor architectures, a cache-like access is provided via a processor-to-memory interface. An example of such a cache-like interface is an On-Chip Memory ("OCM") interface of a PowerPC processor. A PowerPC processor core is embedded in FPGAs available from Xilinx, Inc. of San Jose, Calif. An OCM interface may be used to provide cache-like access to memory, and such memory may be capable of storing more information than level one cache. However, Virtex-5™ FPGAs with embedded PowerPC processors do not have OCM interfaces such as those available in Virtex-4™ FPGAs with embedded PowerPC processors, for example. As a result, level one cache-like access using an OCM interface is not available on Virtex-5™ FPGAs. Thus, an alternative to cache-like OCM interface access is needed in Virtex-5™ FPGAs.

Accordingly, generally it would be desirable and useful to provide means for cache-like access without having to use an OCM interface.

SUMMARY

One or more aspects of the invention generally relate to integrated circuits and, more particularly, to access to data storage with a fixed latency.

An aspect of the invention relates generally to a method for access to data storage. A general-purpose processor and an auxiliary processing unit interface coupled to the general-purpose processor are provided. Data storage coupled to the general-purpose processor via the auxiliary processing unit interface is provided for a fixed or low, though variable, read latency access and a fixed write latency access to the data storage. A first instruction is passed to the general-purpose processor and to the auxiliary processing unit interface. The first instruction is identified as part of a set of instructions accessible by the auxiliary processing unit interface. The first instruction is used to write data into the data storage. A second instruction is passed to the general-purpose processor and to the auxiliary processing unit interface. The second instruction is identified as part of the set of instructions accessible by the auxiliary processing unit interface. The second instruction is used to read the data from the data storage. The data read from the data storage is then output, e.g., stored, passed to back-end logic, the auxiliary processing unit interface, and/or the general-purpose processor, provided to a user, etc.

Another aspect of the invention relates generally to a system with a general-purpose processor and an auxiliary processing unit interface coupled to the general-purpose processor. Data storage is coupled to the general-purpose processor via the auxiliary processing unit interface for a fixed or low, though variable, read latency access and a fixed write latency access to the data storage. The general-purpose processor is coupled for receiving an instruction and configured to pass the instruction to the auxiliary processing unit interface responsive to the instruction not being part of a general-purpose processor instruction set. The auxiliary processing unit interface is configured to identify the instruction as part of an auxiliary processing unit interface instruction set and to access the data storage responsive to the instruction for the general-purpose processor. The access is selected from a group consisting of the fixed read latency access and the fixed write latency access to the data storage.

Added to such aspects of the invention may be one or more algorithmic engines placed between an auxiliary processing unit interface and data storage, where such auxiliary processing unit interface couples such data storage to a general-purpose processor. Such one or more algorithmic engines may provide intelligent data lookup or operations on data provided to or retrieved from the data storage.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items. However, in alternative embodiments the items may be different.

Figure 1:
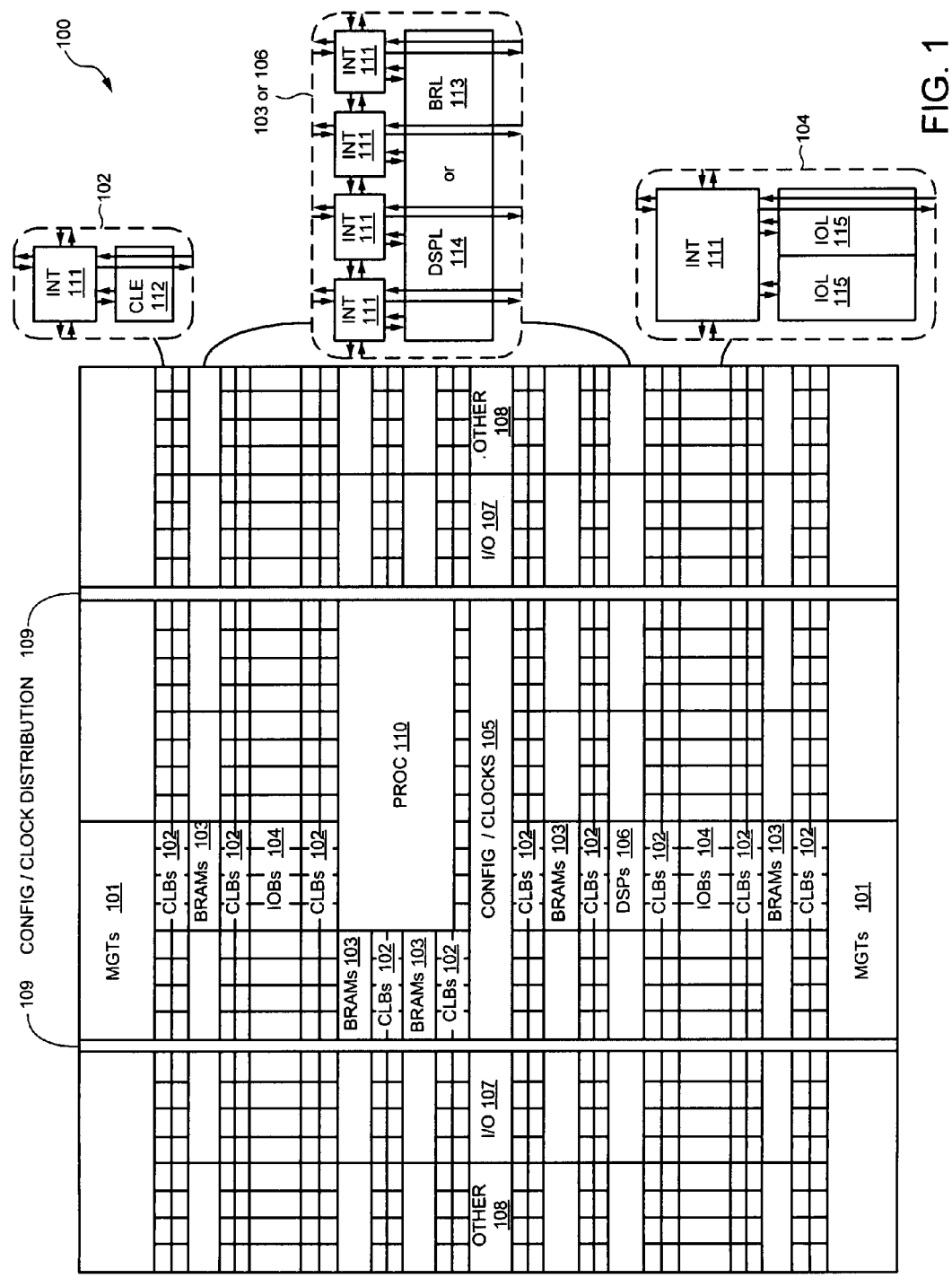
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ or Virtex-5™ FPGA from Xilinx of San Jose, Calif.

Newer versions of such FPGAs may include a coprocessor interface controller. An exemplary coprocessor interface controller that may be implemented in an FPGA is described in detail in U.S. Pat. No. 7,200,723 to Ansari et al, filed Aug. 6, 2004 and issued Apr. 3, 2007, which is incorporated by reference herein in its entirety for all purposes. Notably, Virtex-4™ FPGAs and Virtex-5™ FPGAs from Xilinx of San Jose, Calif. are now available with such a coprocessor interface controller.

Figure 2:
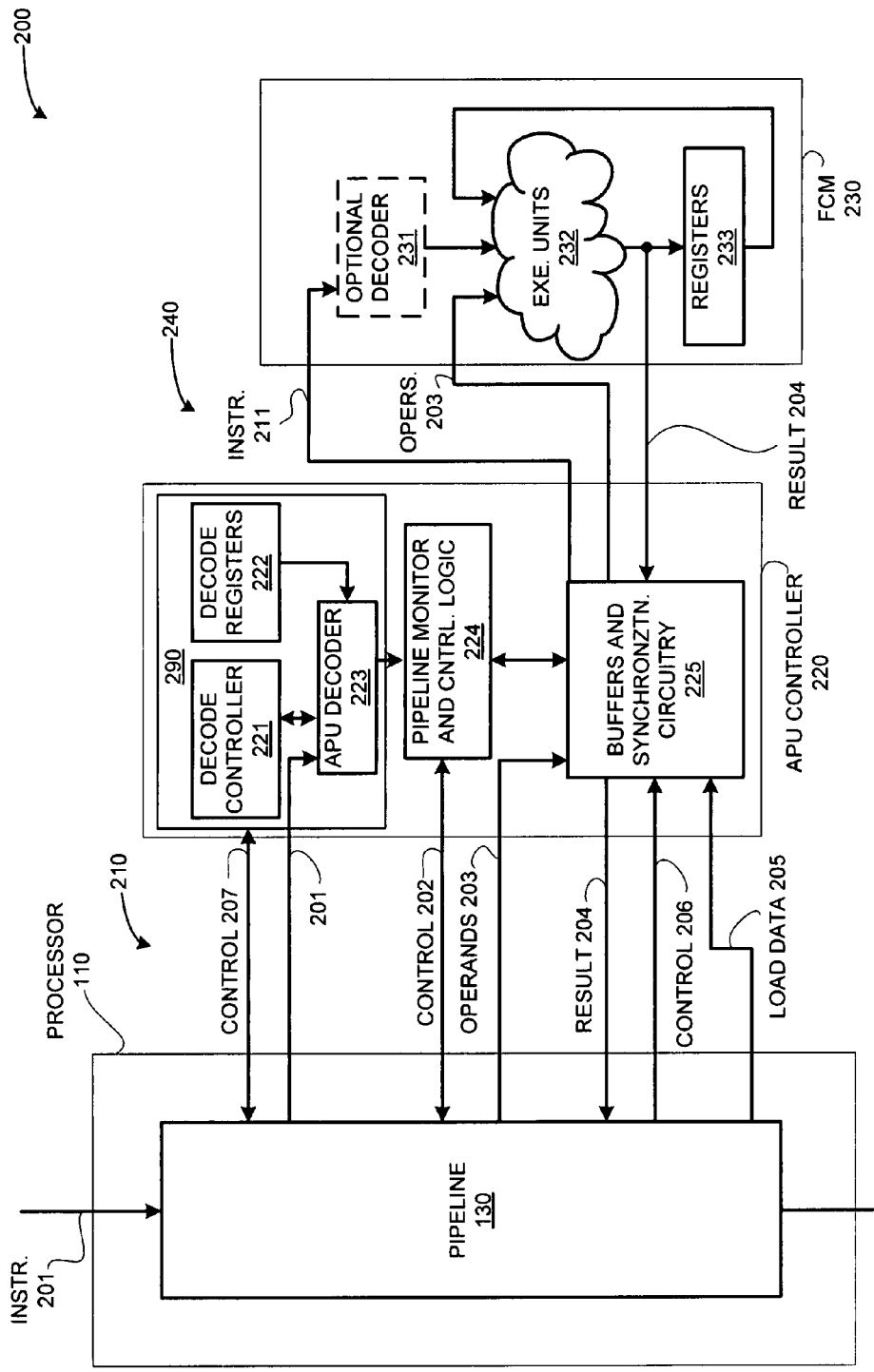
FIG. 2 is a block/data flow diagram depicting an exemplary embodiment of an embedded system having a coprocessor interface or controller.

FIG. 2 is a block/data flow diagram depicting an exemplary embodiment of an embedded system 200 having a coprocessor interface controller, e.g., as set forth in U.S. Pat. No.

7,200,723, referenced above. Embedded system 200 includes processor 110 coupled to fabric coprocessor module ("FCM") 230 via auxiliary processing unit ("APU") controller 220. FCM 230 is a coprocessor instantiated in configurable circuitry ("fabric") of an FPGA. In an alternative embodiment, FCM 230 may include dedicated hardware circuitry (operating at a frequency less than processor 110) or a combination of dedicated hardwire circuitry and configurable circuitry.

Processor 110 is formed of dedicated circuitry, and thus is a "hard" or "embedded" processor which is capable of operating at frequencies substantially in excess of the maximum operating frequency of the fabric of an FPGA, such as FCM 230. APU controller 220 is formed of dedicated circuitry, and thus is a "hard" or "dedicated" controller which is capable of operating at frequencies equivalent to operating frequencies of embedded processor 110. APU controller 220 may be formed, for example, in a hard processor block of an FPGA with embedded processor 110. Notably, in an another embodiment described below, APU controller 220 operates at a frequency less than that of processor 110 though in excess of the frequency of operation of FCM 230.

Because APU controller 220 can operate at a rated speed of embedded processor 110, APU operates on processor interface 210 in lock-step with pipeline 130 of embedded processor 110 and generates/handles handshaking signals between embedded processor 110 and FCM 230. In other words, embedded processor 110 does not need to be slowed down to work with FCM 230, as APU controller 220 provides an interface to and from processor 110 capable of operating at a rated speed of processor 110. Thus, it should be understood that processor interface 210 operates in a clock domain of processor 110 and coprocessor interface 240 operates in a clock domain of FCM 230, where the frequency of the clock domain of processor 110 is greater than or equal to the frequency of the clock domain of FCM 230. Notably, as a pipeline of an embedded processor of an FPGA is known, pipeline 130 is not described herein in unnecessary detail.

It should be understood that embedded processor 110 of FIG. 1 has a processor interface 210. APU controller 220 can work with an off-the-shelf ("OTS") embedded processor core having a known processor interface 210. Moreover, APU controller 220 can work with an OTS embedded coprocessor core. For example, APU controller 220 may couple an embedded PowerPC 405 microprocessor core from IBM and an embedded FPU from Xilinx, Inc. of San Jose, Calif.

Notably, in contrast to where an embedded processor may have to be slowed to operate in lock-step with a coprocessor, FCM 230 and embedded processor 110 may be run at different speeds. Thus, execution by embedded processor 110 does not have to be slowed or stalled to operate FCM 230. The ability to operate a coprocessor at a different speed than a processor is not limited to a coprocessor instantiated in FPGA fabric. For example, dedicated logic coprocessors exist that are not capable of running at rated speeds of processors to which they are mated. APU controller 220 may be implemented between an embedded processor and an embedded coprocessor in order to operate the two devices at different speeds. Furthermore, APU controller 220 is not limited to System-on-Chip ("SoC") or embedded system applications, as APU controller 220 may be part of a standalone microprocessor integrated circuit or part of a standalone coprocessor integrated circuit. However, for purposes of clarity and not limitation, a coprocessor is described hereinbelow as FCM 230 instantiated in configurable logic of an FPGA having an embedded processor 110 and an embedded APU controller 220.

APU controller 220 receives instruction 201 from a decode stage (not shown) of pipeline 130 of embedded processor 110. Assuming instruction 201 is an instruction for execution by FCM 230, APU decoder 223 decodes instruction 201 for execution by FCM 230. APU decoder 223 provides a signal to decode controller 221 indicating whether instruction 201 is for FCM 230.

APU decoder block 290 of APU controller 220 includes decode controller 221, decode registers 222, and APU decoder 223. Basically, APU decoder 223 decodes an instruction 201 from processor 110 using control information from decode controller 221 and, in the instance of a user-defined instruction ("UDI") in particular, information from decode registers 222. APU decoder block 290 is in bidirectional communication with pipeline 130 for communicating control information 207. Control information 207 may, for example, include whether processor 110 has an instruction to decode, if FCM 230 can decode an instruction at this time, or if APU decoder 223 has decoded an instruction for FCM 230. APU decoder 223 may obtain input from decode registers 222, which may include FCM instructions or user-defined instructions ("UDIs"), including without limitation a combination thereof. However, generally decode registers 222 are for UDIs.

A decoded instruction for FCM 230 is provided from APU decoder 223 to pipeline monitor and control logic 224. Pipeline monitor and control logic 224 monitors at least part of pipeline 130 of processor 110. Pipeline monitor and control logic 224 is in bidirectional communication with an execution stage (not shown) of pipeline 130 for communicating control information 202. Control information 202 may, for example, include if FCM 230 has finished executing an instruction and has a result or if processor 110 needs to stall the pipeline for some reason.

Pipeline monitor and control logic 224 is in bidirectional communication with buffers and synchronization circuitry 225 for communicating when data from processor 110 is valid (such as source data or an instruction) and when processor 110 has control information, such as for example holds, flushes, or when it is acceptable for FCM 230 to update internal registers. In the other direction, buffers and synchronization circuitry 225 notifies pipeline monitor and control logic 224 when result data is ready. For example, an instruction 221 may be provided from pipeline monitor and control logic 224 to buffers and synchronization circuitry 225, where such instruction may be buffered. Instruction 221 may be passed from buffers and synchronization circuitry 225 to one or more execution units 232 operating in FCM 230. There are many known types of execution units, including without limitation adders, half-adders, and multipliers, among others. The type and configuration of execution units is user-determined depending on how and what FCM instructions are instantiated to provide FCM 230. Optionally, a decoder 231 may receive an instruction 221 for decoding in FCM 230, and then pass such decoded instruction to execution units 232. Moreover, one or more operands 203 from processor 110 may be received by buffers and synchronization circuitry 225 for instruction 221, and such operands 203 may be provided to one or more execution units 232. Furthermore, control signals 206 may be provided from a write-back stage (not shown) of pipeline 130 to buffers and synchronization circuitry 225 for control information, such as for example flush signals or indications that it is acceptable for FCM 230 to update internal registers. Additionally, load data 205 may be provided to buffers and synchronization circuitry 225 for passing load data, as part of operands 203, from processor 110 to FCM 230.

One or more of execution units 232 may be user-defined. Output of one or more execution units 232 may be provided to buffers and synchronization circuitry 225 for returning result data 204 to processor 110 or to registers 233 to be accessible to one or more execution units 232.

Figure 3:
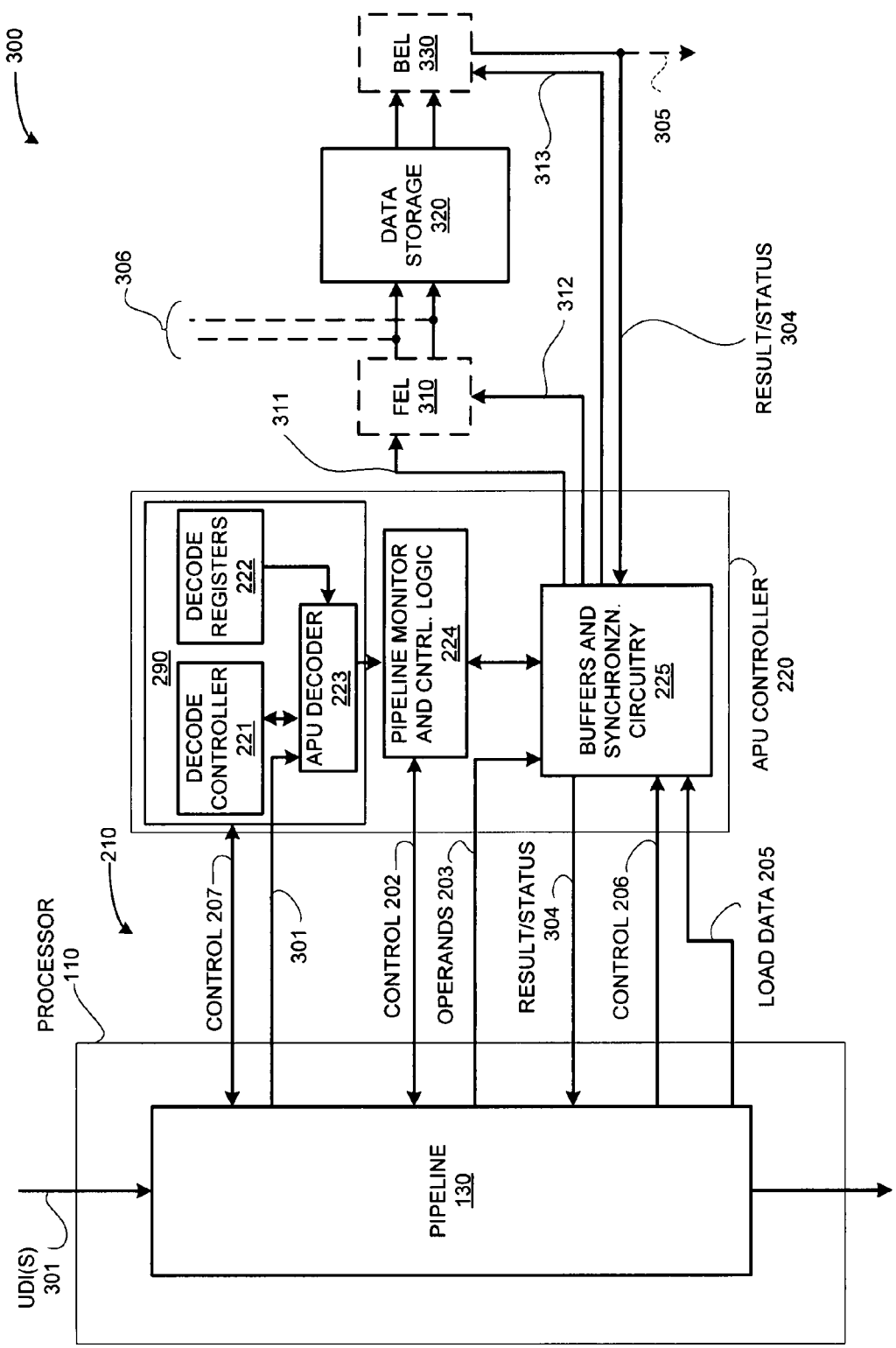
FIG. 3 is a block/data flow diagram depicting an exemplary embodiment of an embedded system having a coprocessor interface or controller coupled to data storage.

FIG. 3 is a block/data flow diagram depicting an exemplary embodiment of an embedded system 300 having a coprocessor interface or controller, namely APU controller 220, coupled to data storage 320. Embedded system 300 includes processor 110 coupled to data storage 320 via at least in part APU controller 220. Additionally, optionally one or more of front-end logic ("FEL") 310 or back-end logic ("BEL") 330 may be coupled to data storage 320 as described in additional detail below. One or more UDIs 301 are provided to processor 110. UDIs 301 are not part of the instruction set of processor 110, and as such UDIs 301 are provided to APU controller 220 as previously described. APU controller 220 is configured to identify one or more UDIs 301 as part of instruction set accessible by APU controller 220. UDIs 301 may be for write/read access to data storage 320.

Notably, it is assumed that data storage 320 is part of an embedded system 300. In other words, data storage 320 may reside on the same integrated circuit chip as processor 110 and APU controller 220. However, optionally data storage 320 may be in external memory coupled to such integrated circuit chip. In this particular example, the integrated circuit chip is an FPGA; however, it should be appreciated that any of a variety of chips may have an embedded processor, an APU controller, and data storage as described herein.

APU controller 220 decodes and passes the one or more decoded UDIs 311 to data storage 320. Data storage 320 in response to the one or more UDIs 311 provides result or status information 304. Result or status information 304 may be data obtained from data storage 320 or it may be an acknowledgment that data has been written to data storage 320. These are but two examples and other examples, including those described below in additional detail for use with data storage 320, may be used.

There are a variety of possible implementations for data storage 320. For example, data storage 320 may be implemented as content addressable memory ("CAM"). Data storage 320 may be implemented as random access memory, more particularly; data storage 320 may be implemented using BRAM 103, which is a multi-ported random access memory of FPGA 100 of FIG. 1. Notably, though multi-ported memory is described herein, single ported memory may be used. Furthermore, data storage 320 may be implemented as a lookup table using random access memory. For example, BRAM 103 of FPGA 100 may be used to provide lookup table capability. Alternatively, lookup table random access memory or "LUTRAM" may be implemented using at least one CLB 102 of FPGA 100, and data storage 320 may be implemented using such LUTRAM.

It should be appreciated that a fixed latency for a read of data storage 320 and a fixed latency for a write to data storage 320 are implemented by using APU controller 220 coupled to data storage 320. In other words, the ability to have fixed latencies for data reads from and data writes to data storage 320 facilitates operating data storage 320 for low latency, high clock rate access to on-chip memory. For internal storage capable of operating at the frequency of processor 110, cache-like access may be obtained. Again, even though on-chip memory is described, off-chip memory may be used. Such low latency access may be a substitute for an OCM interface available on other FPGAs from Xilinx, Inc. of San Jose, Calif. However, in the Virtex5™ FPGA available from Xilinx, such OCM interface has not been implemented. Thus, the ability to use APU controller 220 to provide fixed latency access to and from data storage 320 allows a low latency, high-speed access to data storage 320.

It should be understood that APU controller 220 on a processor side operates at the clock frequency of processor 110. Furthermore, it should be appreciated that APU controller 220 is coupled into the pipeline of processor 110. Thus, coupling of data storage 320 via APU controller 220, where data storage 320 is on-chip memory, facilitates use of data storage 320 as a cache or cache-like storage. While not wishing to be bound by theory, it is believed that by coupling BRAM 103 for data storage 320 to APU controller 220, embedded system 300 in a Virtex-5™ FPGA may be capable of writing data to data storage 320 in a single clock cycle of processor 110. Moreover, while not wishing to be bound by theory, it is believed that by coupling data storage 320 as an embedded BRAM 103 of FIG. 1 or an embedded LUTRAM of a CLB 102 of FIG. 1 to APU controller 220, data may be read from data storage 320 in three clock cycles of processor 110.

It is not necessary that all access to and from data storage 320 be via APU controller 220. For example, optional lines 306 illustratively show that data storage 320 may be accessed, such as for example for loading or retrieving data from data storage 320 externally with reference to embedded system 300. Furthermore, result/status information 304 need not be provided only via APU controller 220 but optionally may be provided directly out of embedded system 300 as generally indicated by arrow 305.

Figures 4A, 4B:
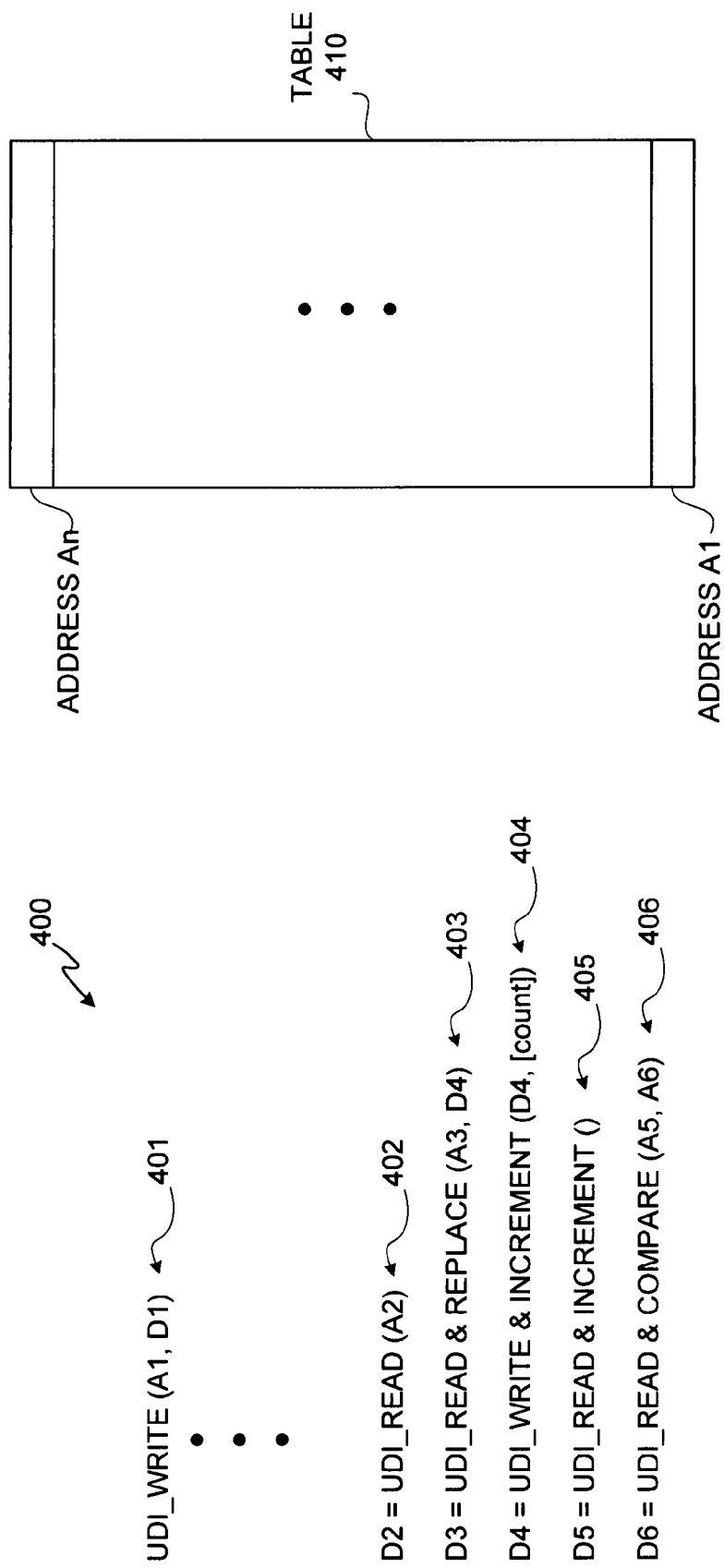
FIG. 4A is a pseudo code listing depicting an exemplary embodiment of user-defined instructions ("UDIs") that may be used with the embedded system of FIG. 3.
FIG. 4B is a block diagram depicting an exemplary embodiment of a table having addresses A1 though An, such as for a lookup table.

FIG. 4A is a pseudo code listing depicting an exemplary embodiments of UDIs 400 that may be used with embedded system 300 of FIG. 3. UDIs 400 may thus represent UDIs 311 of FIG. 3. With reference to FIGS. 3 and 4A, UDIs 400 are further described. Instruction 401 of instructions 400 indicates that a UDI may be associated with a write to data storage 320. Such a write may begin at an address, such as address A1, for writing data, such as data D1, to the location associated with address A1. UDI 401 may be replicated with same or different address and data information for other writes to data storage 320. Reads and other types of UDIs, such as UDIs 402 through 406, may be used.

FIG. 4B is a block diagram depicting an exemplary embodiment of a table 410 having addresses A1 though An, such as for a lookup table 410, where n is an integer greater than one. Again, there may be a repetition of UDI instructions 401 to populate addresses larger than A1 with data values other than D1 as generally indicated.

With simultaneous reference to FIGS. 3, 4A, and 4B, UDIs 400 are further described. Instruction 402 indicates a UDI read instruction. A data value of D2 may be set to equal a UDI read of data storage 320 at address A2, for example. Furthermore, for memory capable of a read-before-write, a UDI instruction 403 may be used for accessing data storage 320. For example, a data value D3 may be set equal to a UDI read and replace instruction for reading an address at A3, outputting the data read at address A3, and writing the data value D4 to address A3 after reading the data value at address A3.

FEL 310 may include a counter or other circuitry (not shown) for doing sequential writes or sequential reads, or a combination thereof. For example, a value D1 may be written at address A1 using instruction 401. Using counter circuitry, subsequent sequential memory locations may be written using instruction 404. For example, instruction 404 may begin by writing at address A1 data D4, where address A1=A1+1, and then with each execution incrementally increases address A1 to write other associated data values. Alternatively, such other associated data may be provided via optional lines 306. Furthermore, in those instances where a single data value is to populate multiple places in a memory, instruction 404 may be used to write the value of D4 to multiple address locations sequentially starting at A4 using the optional second parameter, namely count, to define the number of locations to be written.

Furthermore using counters to read data, instruction 402 indicates that a data value D2 may be set equal to a UDI read starting at an address A2. Using a counter in FEL 310, such counter may be sequenced by control signaling 312 from APU controller 220 such that a sequence of addresses starting at A2 and incremented thereafter are used to read data from data storage 320 via instruction 405, where D5 may be set equal to such read values.

Notably, a combination of front-end and back-end processing may be done or merely either front-end or back-end processing may be done, or neither, with respect to data read or written to data storage 320 as described herein. With respect to back-end processing of such data, BEL 330 may be configured to perform one or more mathematical operations depending on the type of UDI. For example, instruction 406 indicates that a data value D6 is equal to a UDI read and compare instruction. In instruction 406, data is read at address locations A5 and A6, and such data is then compared by BEL 330 for providing a result/status 304. Control signaling 313 may be provided from APU controller 220 to BEL 330 responsive to UDI 406. Although the example of a compare is used, it should be appreciated that any of a variety of known mathematical operations may be used including addition and subtraction, among other known mathematical or more generally manipulation operations, including bit inversion and bit reversal.

It should be appreciated that fixed latency access to data storage 320, and particularly to on-chip memory in the above example, has been described. It should further be appreciated that UDIs 400 are for stateless execution. In other words, a state machine is not required for processing such UDIs. Thus, such UDIs 400 may merely flow through processor 110 to APU controller 220 for immediate execution, which reduces complexity associated with implementation of a state machine, as well as facilitates fixed latency and predictability of execution.

Furthermore, it should be appreciated that a sequence of UDIs 400 may be provided to processor 110 for APU controller 220 to access data storage 320. For example, a data write instruction may be implemented as a UDI where a first operand is data and a second operand is a memory address, as previously described. A second UDI may be for a data read instruction, where the first operand is the memory address used as previously described, and the second operand is not used. Retrieved data may then be returned as the operation result. The ability to use one or more auto-incrementing address counters facilitates successive memory accesses without additional address writes by providing additional UDIs to processor 110. Furthermore, UDIs may be created for read or write operations or both, without using an address. Moreover, an intelligent data lookup may be used where rather than providing a data address, information is passed to an algorithmic engine capable of using the provided data to retrieve additional data from the memory. Thus, for example a Content Associative Memory (CAM), number or text matching system, or hash table lookup may be implemented. In any of these embodiments, FEL 310 may include any data lookup/retrieval by an algorithmic engine such as a CAM, string matching algorithm, or hash table lookup algorithm. Notably, for use of one or more algorithmic engines, read latency access may be either fixed or variable, but if variable such latency may be a sufficiently low latency in comparison to use of external memory.

Furthermore, it should be appreciated that UDI wildcards, which are known, may be used with APU controller 220 for accessing data storage 320. Examples of UDI wildcards include a portion of the processor instruction not decoded by the APU and passed as part of the control signals 206. Such UDI wildcards may be used for additional data passing, addressing or control signals. For example as described above, UDIs were defined to automatically write or read subsequent memory locations and increment a counter. A wildcard bit set to zero may define that the counter is to be incremented. The same bit set to one may define that the counter is to be decremented. A second wildcard bit may be set to 1 to define that the counter is to count by twos.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. For example, although UDIs have been described, it should be appreciated that such instructions need not be defined by a user, but may be part of the instruction set provided with embedded system 300 and loaded into decode registers 222. Claims listing steps do not imply any order of the steps. Trademarks are the property of their respective owners.

What is claimed is:

1. A method for access to data storage, comprising:
providing a general-purpose processor and an auxiliary processing unit interface coupled to the general-purpose processor;
providing a coprocessor coupled to the auxiliary processing unit interface;
providing data storage coupled to the general-purpose processor via the auxiliary processing unit interface for a read latency access and a fixed write latency access to the data storage;
passing a first instruction to the general-purpose processor;
passing the first instruction from the general-purpose processor to the auxiliary processing unit interface;
identifying the first instruction as part of a set of instructions accessible by the auxiliary processing unit interface;
wherein the first instruction is a store instruction that specifies a write address in the data storage and write data to write to that address;
passing the first instruction from the auxiliary processing unit interface to the data storage and bypassing the coprocessor in the passing of the first instruction;
storing the write data in the data storage at the write address in response to the first instruction;
passing a second instruction to the general-purpose processor;
passing the second instruction to the auxiliary processing unit interface;
identifying the second instruction as part of the set of instructions accessible by the auxiliary processing unit interface;
wherein the second instruction is a read instruction that specifies a read address in the data storage;
passing the second instruction from the auxiliary processing unit interface to the data storage and bypassing the coprocessor in the passing of the second instruction;
reading data from the data storage at the read address in response to the second instruction; and outputting the data read from the data storage to the general-purpose processor.

2. The method according to claim 1, wherein the data storage is for an algorithmic engine; and wherein the read latency access is either a fixed or a variable read latency access.

3. The method according to claim 1, wherein the data storage is a single or multi-ported random access memory; and wherein the read latency access is a fixed read latency access.

4. The method according to claim 1, wherein the data storage is a lookup table random access memory.

5. The method according to claim 4, wherein the lookup table random access memory uses at least one configurable logic block.

6. The method according to claim 1, wherein the general-purpose processor, the auxiliary processing unit interface, and the data storage are all part of a single integrated circuit chip.

7. The method according to claim 6, wherein the single integrated circuit chip is a programmable logic device.

8. The method according to claim 1, wherein the data storage is used as cache for the general-purpose processor.

9. The method according to claim 8, wherein the data storage includes a block random access memory.

10. The method according to claim 1, wherein the first instruction is a first user-defined instruction; and wherein the second instruction is a second user-defined instruction.

11. The method according to claim 10, wherein the set of instructions is a set of user-defined instructions.

12. The method according to claim 11, wherein the set of user-defined instructions includes a read and replace user-defined instruction; and
wherein the read and replace instruction specifies a read-and-replace address in the data storage from which data is to be read and specifies read-and-replace data to be written at the read-and-replace address after the data has been read.

13. The method according to claim 11, wherein the set of user-defined instructions includes a read and bit manipulation operation instruction for reading data from at least two addresses and performing the bit manipulation operation on the data read.

14. The method according to claim 11, wherein the set of user-defined instructions includes a load-store instruction for writing data to a sequence of addresses starting from an initial address.

15. The method according to claim 11, wherein the set of user-defined instructions includes a sequential read instruction for reading data from a sequence of addresses starting from an initial address.

16. A system, comprising:
a general-purpose processor;
an auxiliary processing unit interface coupled to the general-purpose processor;
a coprocessor coupled to the auxiliary processing unit interface;
data storage coupled to the general-purpose processor via the auxiliary processing unit interface for a read latency access and a fixed write latency access to the data storage;
the general-purpose processor coupled for receiving an instruction;
the general-purpose processor configured to pass the instruction to the auxiliary processing unit interface responsive to the instruction not being part of a general-purpose processor instruction set;
the auxiliary processing unit interface configured to identify the instruction as part of an auxiliary processing unit interface instruction set;
wherein the instruction is one of a read instruction or a store instruction and specifies an address in the data storage, and for the store instruction the instruction further specifies write data; and
the auxiliary processing unit interface configured to access the address in the data storage responsive to the instruction, wherein data read from the data storage in response to the read latency access is returned to the general-purpose processor, and the write data is stored in the data storage at the address in response to the write latency access
wherein the auxiliary processing unit interface bypasses the coprocessor in accessing the address in the data storage.

17. The system according to claim 16, wherein the system is a System-on-a-Chip; and wherein the read latency access is either a fixed or variable read latency access.

18. The system according to claim 16, wherein the system is implemented in a programmable logic device; and wherein the read latency access is a fixed read latency access.

19. The system according to claim 16, wherein the data storage is cache for the general-purpose processor; and wherein the read latency access is a fixed read latency access.

20. The system according to claim 16, wherein the instruction is processed without use of a state machine for stateless execution.

* * * * *